United States Patent [19]

Müller

[11] Patent Number: 5,223,987

[45] Date of Patent: Jun. 29, 1993

[54] METHOD AND APPARATUS FOR REPRODUCING AT A SELECTED SPEED VIDEO SIGNALS RECORDED ON MAGNETIC TAPE

[75] Inventor: Jürgen Müller, Griesheim, Fed. Rep. of Germany

[73] Assignee: BTS Broadcast Television Systems GmbH, Darmstadt, Fed. Rep. of Germany

[21] Appl. No.: 544,742

[22] Filed: Jun. 27, 1990

[30] Foreign Application Priority Data

Jul. 6, 1989 [DE] Fed. Rep. of Germany ....... 3922214

[51] Int. Cl.$^5$ .......................... H04N 5/78; G11B 15/18
[52] U.S. Cl. .................. 360/10.3; 360/33.1; 360/72.2
[58] Field of Search ............... 360/14.1, 14.2, 14.3, 360/72.2, 10.3, 10.1, 33.1; 358/311, 335, 314

[56] References Cited

U.S. PATENT DOCUMENTS

| | | | |
|---|---|---|---|
| 4,340,916 | 1/1982 | Menezes | 360/72.2 |
| 4,498,104 | 2/1985 | Schulz | 358/160 |
| 4,791,499 | 12/1988 | Mester | 360/10.3 |

Primary Examiner—Aristotelis Psitos
Assistant Examiner—Varsha V. Sheladia
Attorney, Agent, or Firm—Frishauf, Holtz, Goodman & Woodward

[57] ABSTRACT

The magnetic tape video playback apparatus for a digital video signal regenerates the sample rate from the playback to operate a counter and detects the video data block numbers to permit an address generator to derive the more significant bits of addresses for a picture memory in which the video data signal is temporarily stored. The counter provides the less significant bits of the write addresses. The separated vertical sync pulses are counted in a second counter to provide time information for storage in a time data memory which is operated in parallel with the picture memory, using the write addresses from the already mentioned address generator. A reference sample rate generator operates a third counter which provides the read out addresses for the picture and time data memories. The memory input and output time data are compared and the time difference is evaluated with reference to a threshold for providing an error flag to an error concealment unit to which the video data read out from the picture memory is supplied for concealing errors resulting from overage video data in the picture memory which may be stored there during playback at high speeds. At low speeds the minimum time difference designates an error.

4 Claims, 1 Drawing Sheet

METHOD AND APPARATUS FOR REPRODUCING AT A SELECTED SPEED VIDEO SIGNALS RECORDED ON MAGNETIC TAPE

This invention concerns the playback of video signals recorded on magnetic tape in an equipment in which the playback speed can be varied with respect to the recording speed and in which the picture information played back from the tape is first written into a picture memory, then later read out therefrom, and is then subjected to an error concealment operation.

BACKGROUND AND PRIOR ART

Digital recording of video signals on magnetic tape is the subject of published recommendations provided by the society of motion picture and television engineers (SMPTE). These have become known as the D1 and D2 standards. In the recommended D2 Standard it is specified that the video information of a picture field is to be distributed for recording on two or more successive oblique tracks on the tape. Each oblique track contains one video sector and four audio sectors, each sector beginning with a so-called preamble. After the preamble two or more synchronization blocks follow and then data and checking blocks. The sectors each terminate with a so-called postamble.

The reproduction of video signals thus recorded requires an intermediate memory into which the individual data blocks of the video signal played back from the oblique tracks are written and from which they are again read out for piecing together a complete television picture. The temporary storage of the information permits playback of television pictures both at normal speed and also with every possible slow motion and accelerated motion speed. In reproduction of television pictures with accelerated (time-compression) speed, however, the intermediate memory operates as an intergrator with infinitely long time constant, however, because in this mode of operation the rotating playback magnetic heads scan valid video data only in small track sections, so that older portions of a television picture can be replaced with current video data only after a relatively long time. The stale picture portions produce a "torn up" impression in observation of the television picture.

For mitigation of these disturbing picture effects it has already been proposed in U.S. Pat. No. 4,791,499 to collect the picture information in groups and to write them into a memory with an age indication for a storage duration dependent upon the operation of the tape transport speed. If one of the stored groups overstays the prescribed storage duration, the corresponding group is erased. Then an error concealment stage downstream of the memory can derive error free substitute data in place of the data of the erased picture elements, the substitute data being obtained from originally neighboring error free pixels.

This known method has the disadvantage, however, that a system for administering the storage duration during a picture memory write-read cycle, must carry out several computer operations in order to determine the storage duration for the picture information under consideration. Furthermore, within the picture memory read-write cycle erasing values must be written into the picture memory in the place of data groups found to be stale. The logic components available at present are yet too slow to carry out these operations during the time available therefor. In addition, disturbances during dropouts in the played back data stream lead to additional delays in the determination of the storage duration of the data groups written into the picture memory.

SUMMARY OF THE INVENTION

It is an object of this invention to provide a method of the general kind described above, in the use of which the elapsed storage time of the picture information in a picture memory can be determined in real time.

Briefly, in parallel with the writing of the information into the picture memory, current time information is written into a time data memory, which is then read out in parallel with the reading of picture information from the picture memory. Then the time information read out of the time data memory is compared with current time information, so that in a manner dependent upon the time difference and upon the contemporary speed of movement of the magnetic tape, error concealment of erroneous pixels in the picture information can thereafter be carried out.

The method of the invention has the advantage that the picture information that is read out from the memory can be correlated immediately with absolute time information. A simple comparison between information read out and the current time information being supplied to the time information memory makes it possible to recognize at once whether or not the picture information being read out is to be characterized as stale or, perhaps, erroneous.

It is particularly advantageous for the capacity of the time information memory to be substantially smaller than that of the picture memory. There is also the further advantage that the method of the invention can be kept in operation even during a normal speed playback operation in which the playback tape speed is equal to the recording tape speed.

DESCRIPTION OF THE ILLUSTRATED EXAMPLE

Figure 1:
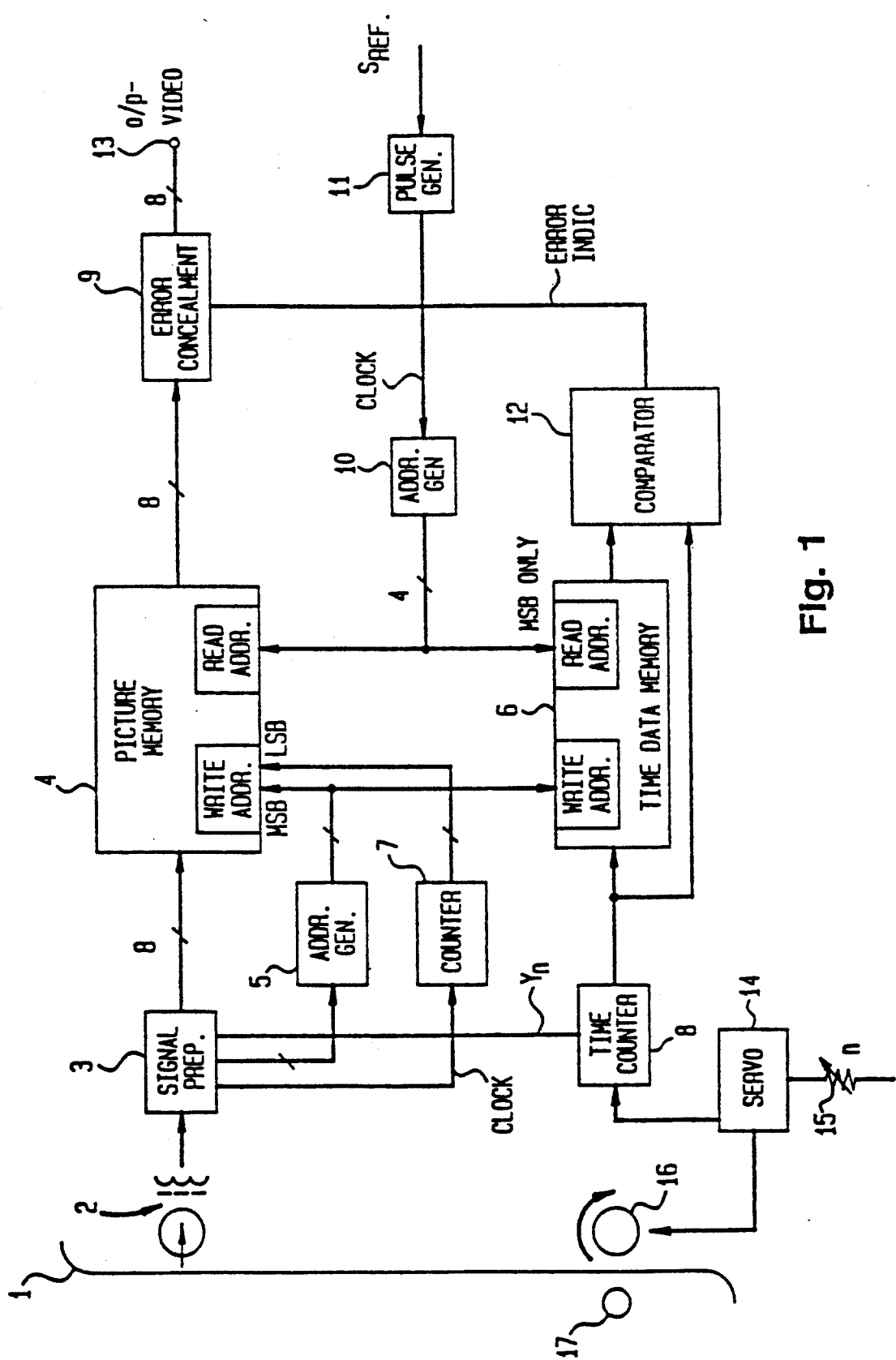
FIG. 1 is a circuit block diagram of an apparatus with reference to which the method of the invention can be readily explained.

The circuit block diagram of FIG. 1 relates to a playback of digital video signals recorded in accordance with the recommendations above-identified as the D2 standard. In that standard, for recording of an NTSC color television signal, the data of the individual picture fields are recorded in each case on six successive oblique tracks with a defined azimuth angle. Each oblique track receives digital data from one video channel and from four audio channels. The audio data are recorded in four audio sectors per track. Two of the audio sectors are located at the beginning of the track and two others at the end of the track. The video data are recorded in a video sector in the track middle. Gaps are provided between the individual sectors in order to facilitate editing.

The video sector starts with a preamble having a word length of 28 bytes. The preamble is followed by 204 synchronization blocks each having a word length of 190 bytes, In these 190 bytes there are in each case 2 bytes respectively for the synchronization pattern and the synchronization number. Then there are 85 bytes for a first data block, 8 bytes for a first check block, 85 bytes for a second data block and 8 bytes for a second check block. The video sector is terminated with a postamble 6 bytes long.

FIG. 1 illustrates playback of data recorded in accordance with D2 standard on a magnetic tape 1. Playback is produced by a rotating playback magnetic head assembly 2. The playback signals are then preamplified, corrected for distortion and put into bit parallel form in a stage 3. In addition, the sample rate incorporated in the data signal is regenerated and the numbers of the synchronization blocks present at a spacing at 190 bytes are detected. Furthermore, a vertical synchronization signal relating to the video data is derived from the data of the video sector, in each case after 6 oblique tracks. The video data available at the output of the stage 3 and having a word width of 8 bits are written into a picture memory 4 at locations dependent upon their addresses. The derivation of the addresses takes place in an address generator 5 with reference to the synchronization numbers detected in the stage 3. The addresses produced by the address generator 5 serve also as writing addresses for the time data memory 6.

Since the synchronization numbers are available only at spacings of 190 bytes, the less significant bits of the write-in addresses for the picture memory 4 are generated by a counter 7 in step with the sample rate regenerated in the stage 3. In other words the addressing of the picture memory 4 is only partly performed by the address generator 5 and the counter 7 is in essence part of that address generator but shown as a separate circuit block. In the time data memory 6, time information produced by a time counter 8 is written in. The time counter 8 is started or restarted by the vertical synchronization signal produced by the stage 3 and advances, for example, every 0.1 sec.

The storage capacity of the time data memory 6 is substantially smaller than that of the picture memory 4, because only enough addresses are necessary as there are synchronization blocks per picture field. With a word length of 190 bytes per synchronization block, the storage capacity reduction factor is 190 for the time data memory 6 with respect to the picture memory 4. If a word width of 8 bits is provided for the time information supplied to the time data memory 6 and if 0.1 seconds is taken as the rythm of the time counter 8, the write-in time can be determined for all data played back within the last 25 seconds from the tape 1 and likewise its significant use in the form of correlation with the video data stored in the picture memory 4. The stored video data in the picture memory are read out word by word in accordance with the successively applied read out addresses and are passed on to an error concealment unit 9. The read-out addresses are generated by a second address generator 10 which is a counter in the illustrated embodiment, controlled by a clock signal derived in a clock pulse generator 11 from a studio reference signal $S_{Ref}$. Only the more significant bits of the read out addresses provided by the counter second address generator 10 are needed for addressing the time data memory 6.

During the read out of video data from the picture memory 4 the corresponding time information is simultaneously read out from the time data memory 6 and is compared in a comparison circuit 12 with the current time information provided at the input side of the memory 6. The comparison stage is designed to supply, in appropriate cases, an error signal, usually called an error flag, which will activate the operation of an error concealment unit 9. Since the construction and function of an error concealment stage is in itself known, for example from U.S. Pat. No. 4,498,104, it is not necessary at this point to describe or further explain this error concealment stage. At an output terminal 13 the error concealed video signal is made available in bit parallel form and properly timed in step with the studio reference signal $S_{Ref}$.

In playback operation the magnetic tape transport speed is determined by a servo 14 which is controllable by a setting control 15 for selection of the tape transport speed. The servo 14 operates by means of a motor 15 (not shown) driving a capstan shaft 16 which transports the tape 1 with the assistance of a rubber pressure roller 17 which provides a friction lock on the tape 1. During a time compression operation, in which the transport speed of the magnetic tape 1 is greater than the transport speed that was used in recording, the playback heads of the rotating playback head mounting 2 are not guided exactly along the recorded oblique tracks. As a result of the uncontrolled crossing of the recorded oblique tracks the video data are not read in consistent blocks from the magnetic tape 1. In order nevertheless to make possible picture reproduction in speeded-up playback, the valid data picked up from the magnetic tape 1 are written into the picture memory 4. Write-in addresses are formed from the block numbers found in the synchronization blocks, so that upon read-out of the picture memory 4 by means of the read-out addresses timed by the studio reference signal, the original arrangement of the pixels is produced. As mentioned in the introduction, it is not possible read all picture data of the currently scanned picture field in the picture memory 4 in the time span during which the playback heads of the rotating magnetic head device 2 scan the oblique tracks on the magnetic tape 1. With increased tape transport speed of the tape 1 the number of valid synchronization blocks played back declines and with it the number of valid video data. For this reason the video data of several successive picture fields are combined into a complete picture field at the cost of a timewise deterioration of resolution. In accordance with the method of the invention, however, the video data do not remain in the picture memory 4 until they are overwritten by new video data from the magnetic tape 1. By these provisions, when the tape transport speed is high and therefore the renewal rate of groups of video data in picture regions is low, the picture is freed from disturbing overaged pixels and the missing pixels are concealed.

The correlation of time information regarding the age of the video data written into the picture memory 4 is provided by means of the time data memory 6 operated in parallel with the picture memory and by the comparison stage 12. In the time data memory 6 the current time information at the output of the time counter 8 is written at the addresses which correspond to the synchronization number of the synchronization blocks that have just been played back from the magnetic tape 1. In read out of the video data from the picture memory 4 the current time information is compared with the time information read out from the time data memory 6 and whenever the difference is more than a prescribed time limit an error flag is provided for the particular data word that designates it as erroneous, resulting in the concealment of the pixel in question in a following error concealment unit. Since the pulse sequence frequency of the vertical synchronization signal supplied to the time counter 8 is locked to the tape transport speed of the tape 1, there is also produced a linkage of the current time information to the tape playback speed selected by means of the speed setting control 15.

During a normal playback operation with playback speed equal to recording speed, as well as in slower playback speed, the comparison stage 12 provides an error flag for alerting the error concealment unit 9 whenever the current time information is different from the read out time information. The method of the invention is therefore suitable also during these normal and slower modes of playback to provide error recognition for video data stored in the picture memory 4.

Although the invention has been described with reference to a particular illustrative example, variations and modifications are possible within the inventive concept. For example it is well within the scope of the present invention to utilize, instead of the error concealment unit 9 connected downstream of the picture memory 4 to provide other means for responding to some or all the time comparison information available at the moment of read-out from the time information memory.

I claim:

1. A method of playing back video signals recorded on a magnetic tape in a video tape equipment in which the playback speed is variable, with reference to the speed at which the video signals were recorded, and wherein picture filed video data of recorded video data blocks are written into a picture memory which is addressed in part by video data block identifying information included in recorded video data blocks, and subsequently read out from said picture memory, characterized in that:

concurrently with the writing of said picture field video data in said picture memory (4) a parallel operation is performed of writing current time information into a time data memory at addresses corresponding to the concurrent addressing of picture field video data in said picture memory;

in that concurrently with the reading out of picture field video data from said picture memory (4), time information previously written in is read out from said time data memory (6);

in that said time information read out of said time data memory (6) is compared with the current time information available for input into said time data memory (6), and the time difference result of said comparison, if it exceeds a predetermined time difference magnitude, is utilized to designate video data being concurrently read out from said picture memory (4) as suitable for immediate treatment as erroneous video data;

in that said video signals are digital and are recorded in groups each subdivided into numbered blocks of uniform size;

in that addresses for addressing said picture and time data memories are derived form block numbers relating to individual blocks, and in that detailed time information for writing into said time data memory at appearances of successive block numbers is derived from counting equal increments of time and said counting is started by a vertical synchronizing signal pulse played back from said tape and, after overflow of counting, restarted by another vertical synchronizing signal pulse played back from said tape.

2. The method of claim 1 wherein a first predetermined time difference magnitude is utilized to designate erroneous video data being concurrently read out during playback at a tape speed exceeding the tape speed at which said video data was recorded and a second predetermined time difference magnitude is utilized to designate as erroneous video data being concurrently read out during playback operation at a tape transport speed which is equal to or lower than the tape transport speed at which video data was recorded on said tape.

3. The method of claim 1, wherein an error concealment procedure is performed on some video data designated as erroneous by a criterion of time comparison.

4. Apparatus for playback of a tape recorded digital video data signal from a magnetic tape driven at a selectable playback tape speed, said apparatus having a variable speed tape drive, a rotary device equipped with playback magnetic heads for scanning said tape obliquely to its direction of movement, means for subjecting the output of said playback magnetic heads to preamplification, distortion compensation, synch pulse separation and video data block number detection to produce a processed video data signal for temporary storage, means for deriving sample rate clock pulses from said output of said playback magnetic heads, and picture memory means (4) for storing said processed video data signal, and further comprising:

a first counter (8) connected for counting equal time increments and connected to said synch pulse separation means for starting time increment counting in response to a pulse of a vertical synchronizing signal and for restarting after an overflow of said first counter, in response to another pulse of said vertical synchronizing signal, said first counter (8) having a multi-bit output for a time signal produced by counting said time increments;

a first address generator (5) having an input connected to said video data block number detection means for deriving more significant bits of a write-in address signal for said picture memory means (4) from said detected block numbers and having an output;

a second counter (7) connected for supplementing said first address generator in less significant bit addressing of said picture memory means (4) and connected for counting said sample rate clock pulses supplied by said mean for subjecting the output of said playback magnetic heads to preamplification, distortion compensation and synch pulse separation;

a second address generator (10) connected to a source (11) o timing reference signals for deriving a read address signal for said picture memory means from said reference signals and having an output;

a time information random-access memory (6) having a multi-bit data input connected to said multi-bit output of said first counter (8) and having a write-in address input connected with said output of said first address generator (5) for receiving therefrom a plurality of more significant bits of said write-in address signals and read address inputs connected with outputs of said second address generator (10) for receiving therefrom a plurality of more significant bits of said read address signal, said time information memory having a read-out output for time data signals;

an error flag generating stage (12) having means for determining magnitude and presence of a time difference between a time signal being written into said time data memory from said output of said first counter and a time data signal being read out from said output of said time data memory, including means for producing an error flag output whenever said time difference exceeds a predetermined time difference magnitude;

electrical connection means for providing said output of said first address generator (5) and a count content output of said second counter (7) to write-in address input of said picture memory means (4); p1 electrical connection means for providing outputs of said second address generator (10) to read address inputs o said picture memory means, and error concealment mans (9) having a video data signal input connected for receiving video data read out from said picture memory means (4) and a control input connected to said error flag output of said error flag generating stage and having a video data signal output.

\* \* \* \* \*